United States Patent [19]

Streifer et al.

[11] Patent Number: 4,575,194

[45] Date of Patent: Mar. 11, 1986

[54] SEMICONDUCTOR LASER BEAM COLLIMATOR

[75] Inventors: William Streifer, Palo Alto; Donald R. Scifres, Los Altos; G. A. Neville Connell, Cupertino, all of Calif.

[73] Assignee: Xerox Corporation, Stamford, Conn.

[21] Appl. No.: 593,210

[22] Filed: Mar. 26, 1984

[51] Int. Cl.[4] ............................ G02B 6/18; G02B 6/32
[52] U.S. Cl. ................................ 350/413; 350/96.18; 350/96.31
[58] Field of Search .................... 350/413, 96.18, 96.31

[56] References Cited

U.S. PATENT DOCUMENTS

| 3,894,789 | 7/1975 | Kobayashi et al. | 350/413 X |
| 4,025,157 | 5/1977 | Martin | 350/413 X |
| 4,333,173 | 6/1982 | Yonezawa et al. | 350/286 X |

OTHER PUBLICATIONS

W. Streifer et al, "Analytic Solution of Ray Equations In . . . Media, Part 1: Meridional Rays", *Applied Optics*, vol. 10(4), pp. 769-775 (4/71).
K. B. Paxton et al, "Analytic Solution of Ray Equations . . . Guiding Media, Part 2: Skew Rays", *Applied Optics*, vol. 10(5), pp. 1164-1171 (5/71).
K. B. Paxton et al, "Aberrations & Design of Graded-Index (GRIN) Rods Used As Image Relays", *Applied Optics*, vol. 10(9), pp. 2090-96 (9/71).

*Primary Examiner*—John K. Corbin
*Assistant Examiner*—Scott J. Sugarman
*Attorney, Agent, or Firm*—W. Douglas Carothers, Jr.

[57] ABSTRACT

An improved collimating and conversion means is provided in a single system component that can be easily formed in a cost effective manner to convert an elliptically shaped collimated beam into a circular beam. The single component of this invention is a semiconductor laser beam collimator comprising means for collimating an output beam of radiation emitted from a semiconductor laser having a substantially elliptical cross sectional configuration and converting the emitted beam of radiation into a beam of circular cross sectional configuration, the means characterized by consisting of a graded-index (GRIN) rod or fiber with one end of the rod being beveled at an angle. The length of the GRIN rod bevel and the bevel angle are chosen according to the particular diameter and optical power of the emitted beam of the semiconductor laser.

6 Claims, 3 Drawing Figures

SEMICONDUCTOR LASER BEAM COLLIMATOR

BACKGROUND OF THE INVENTION

This invention relates to means for collimating a beam of radiation and converting the beam of radiation from a substantially elliptical cross sectional configuration into a beam of radiation of circular cross sectional configuration.

As is well documented in the art, the use of lasers, and now, in particular semiconductor lasers, play an important roll as the radiation or light sources for optical recording and reproducing systems. In such applications, it is desirable that the spot of radiation be circular and have a uniform intensity distribution. This is particularly true relative to semiconductor lasers, such as GaAs/GaAlAs heterostructure lasers, which, due to the p-n junction plane of radiation, causes the beam of emission to be elliptical, with the long axis of elliptical cross sectional configuration being parallel to the laser p-n junction.

Elaborate lens systems have been developed to meet the need of uniform intensity distribution and circular configuration. One example is disclosed in U.S. Pat. No. 4,333,173 wherein in combination with a coupling and objective lens system, a prism is employed whereby the beam collimation and conversion of an elliptically shaped beam into a circular beam is rendered possible.

The disadvantage of this system is the number of optical elements necessary to accomplish the desired results of collimation and conversion including the precision and costly manufacture of the prism relative to the type of semiconductor laser and its divergence angle of beam admission and the securence of these system components in fixed relation for a particular application.

SUMMARY OF THE INVENTION

According to this invention, an improved collimating and conversion means is provided in a single system component that can be easily formed in a cost effective manner to convert an elliptically shaped collimated beam into a circular beam. The single component of this invention is a semiconductor laser beam collimator comprising means for collimating an output beam of radiation emitted from a semiconductor laser having a substantially elliptical cross sectional configuration and converting the emitted beam of radiation into a beam of circular cross sectional configuration, the means characterized by consisting of a graded-index (GRIN) rod or fiber with one end of the rod being beveled at an angle. The length of the GRIN rod bevel and the bevel angle are chosen according to the particular diameter and optical power of the emitted beam of the semiconductor laser.

Further attributes and attainments together with a fuller understanding of the invention will become apparent and appreciated by referring to the following description and claims taken in conjunction with the accompanying drawings.

DESCRIPTION OF THE PREFERRED EMBODIMENTS

Figure 1:
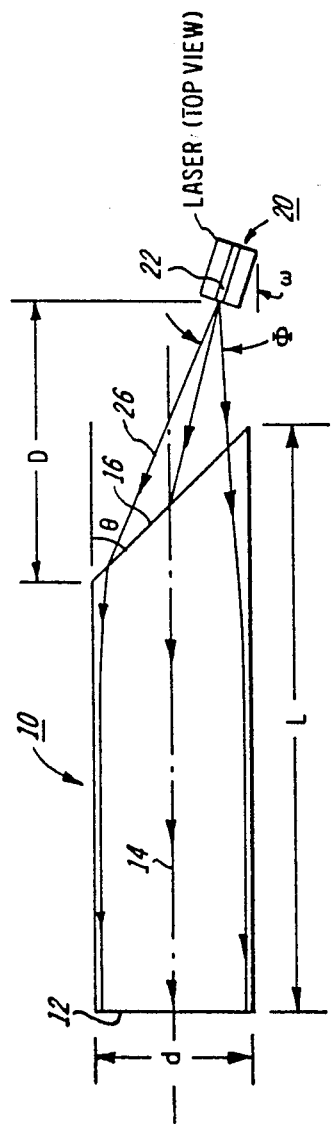
FIG. 1 is a side elevation of the semiconductor laser beam collimator of this invention.
Figure 2:
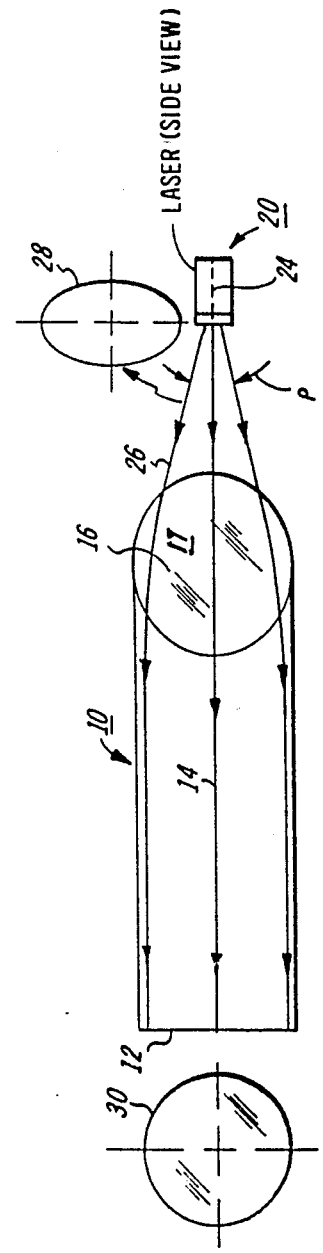
FIG. 2 is a top elevation of the semiconductor laser beam collimator of this invention.

Referring to FIGS. 1 and 2, collimator 10 comprises a graded-index (GRIN) rod or fiber having a length L and a diameter d. One end 12 of collimator 10 is in a plane normal to the axis 14 of the collimator. The other end 16 is polished to form a bevel at the end at an angle $\frac{1}{4}$ to the axis 14 of collimator 10. The bevel at angle $\frac{1}{4}$ provides a bevel length, D, as illustrated in FIG. 1.

A semiconductor laser 20, e.g., a GaAs/GaAs heterostructure laser, is positioned at a predetermined distance from the beveled end 16 of collimator 10. Laser 20 has current confining means 22 and a p-n junction 24. Laser 20 is positioned relative to collimator 10 so that the top surface of laser is in a plane that is normal to but oblique to the bevel end 16, as illustrated in FIG. 1. The spatial relationship is determined by the extent of far field pattern of radiation from the laser. In order that most of the radiation emitted from the laser 20 be collected at beveled end 16, the laser 20 is tilted at an angle, $\omega$, as shown in FIG. 1.

Figure 3:
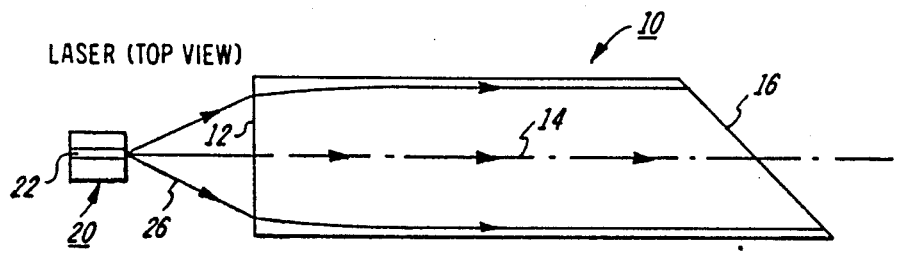
FIG. 3 is an alternative illustrated use of the collimator of this invention.

As can be clearly seen in FIG. 1-3, the top view of surface of laser 20, represented also by the plane of the p-n junction 24, is aligned parallel with the longitudinal extent of the elliptical surface 17 formed at beveled end 16.

Because of asymmetries in the near field intensity distribution and astigmation as well, the far field radiation pattern of the laser beam 26 from laser 20 is highly asymmetrical, particularly in connection with index guided semiconductor lasers. However, gain guided semiconductor lasers are equally important for correction by collimator 10 of astigmatism developed at the laser facet. As an example, the laser 20 in the far field pattern may have a divergence angle, $\Phi$, of approximately 10° between half power points in the plane parallel with the p-n junction 24 whereas orthogonally, the divergence angle, $\rho$, may be approximately 30° forming an elliptically cross sectional configuration 28 as illustrated in FIG. 2.

Rather than using a series of optical components, a single component in the form of the bevel GRIN rod 10 may be employed to collimate the radiation and produce an output beam at collimator end 12 that is of circular cross sectional configuration 30 illustrated in FIG. 2. An objective lens may be employed to focus the collimated beam to spot. By properly choosing the length, D, and bevel angle, $\theta$, for the GRIN rod 10, the laser orientation angle, $\omega$, and spatial distance between rod 10 and laser 20, a substantial portion of its output beam 26 therefrom may be collected for a given rod diameter, d, and optical output power of laser 20. Because of the large incidence angle of output beam 26 relative to bevel end 16, the surface of bevel end 16 may be antireflective (AR) coated.

Aberration may be a cause of concern due to variable path length of beam 26 entering the beveled end 16. However, it is known in the art factors and design considerations in the design of GRIN rod in order to diminish this concern. In this connection, reference is made to the articles of: W. Streifer et al, "Analytic Solution of Ray Equations in Cylindrically Inhomogeneous Guiding Media. Part 1: Meridional Rays", *Applied Optics*, Vol. 10(4), pp. 769–775 (April, 1971); K. B. Paxton et al, "Analytic Solution of Ray Equations in Cylindrically Inhomogeneous Guiding Media. Part 2: Skew Rays", *Applied Optics*, Vol. 10(5), pp. 1164–1171 (May, 1971); and K. B. Paxton et al, "Aberrations & Design of Grade-Index (GRIN) Rods Used as Image Relays", *Applied Optics*, Vol. 10(9), pp. 2090–2096 (September, 1971).

Alternatively, as illustrated in FIG. 3, laser 20 may be disposed in spatial relation to the end 12 of collimator 10 so that the mean path length of the output beam 26 is more normal thereby minimizing aberration. In this configuration of FIG. 3, a collimated circular output beam is produced at end 16.

While the invention has been described in conjunction with specific embodiments, it is evident that many alternatives, modifications and variations will be apparent to those skilled in the art in light of the foregoing description. Accordingly, it is intended to embrace all such alternatives, modifications, and variations as fall within the spirit and scope of the appended claims.

What is claimed is:

1. A semiconductor laser beam collimator comprising means for collimating an output beam of radiation having a substantially elliptical cross sectional configuration emitted from a semiconductor laser and converting said emitted beam of radiation into a beam of circular cross sectional configuration, said output beam emitted from a facet of said laser at the plane of its p-n junction, characterized in that said means comprises a single lens element consisting of a graded-index (GRIN) rod, said GRIN rod having one end beveled to an angle, $\theta$, relative to the optical axis of said GRIN rod forming an elliptical surface, the length, D, and bevel angle, $\theta$, of said GRIN rod chosen according to the particular diameter and optical power of said output beam, the plane of said laser p-n junction aligned parallel to a plane represented by the longitudinal axis of said GRIN rod elliptical surface.

2. The semiconductor laser beam collimator of claim 1 wherein an antireflective (AR) coating is provided on said elliptical surface.

3. The semiconductor laser beam collimator of claim 1 wherein the angular orientation, $\omega$, of said laser relative to a plane parallel to said GRIN rod optical axis and the spatial distance between said GRIN rod and said laser adjusted to capture a substantial portion of said laser output beam.

4. The semiconductor laser beam collimator of claim 3 wherein an antireflective (AR) coating is provided on said elliptical surface.

5. The semiconductor laser beam collimator of claim 3 wherein said angular orientation, $\omega$, is zero.

6. The semiconductor laser beam collimator of claim 5 wherein an antireflective (AR) coating is provided on said elliptical surface.

* * * * *